US008384019B2

(12) United States Patent
Köster et al.

(10) Patent No.: US 8,384,019 B2
(45) Date of Patent: Feb. 26, 2013

(54) INTRODUCTION OF IONS INTO KINGDON ION TRAPS

(75) Inventors: Claus Köster, Lilienthal (DE); Jochen Franzen, Bremen (DE)

(73) Assignee: Bruker Daltonik, GmbH, Bremen (DE)

( * ) Notice: Subject to any disclaimer, the term of this patent is extended or adjusted under 35 U.S.C. 154(b) by 485 days.

(21) Appl. No.: 12/767,273

(22) Filed: Apr. 26, 2010

(65) Prior Publication Data

US 2010/0301204 A1 Dec. 2, 2010

(30) Foreign Application Priority Data

May 12, 2009 (DE) ........................ 10 2009 020 886

(51) Int. Cl.
*B01D 59/44* (2006.01)

(52) U.S. Cl. ......... 250/281; 250/282; 250/283; 250/288

(58) Field of Classification Search ........................ None
See application file for complete search history.

(56) References Cited

U.S. PATENT DOCUMENTS 5,650,617 A * 7/1997 Mordehai ..................... 250/290
5,886,346 A * 3/1999 Makarov ....................... 250/291
6,121,607 A * 9/2000 Whitehouse et al. ......... 250/288
6,872,938 B2 * 3/2005 Makarov et al. .............. 250/281
2001/0050335 A1 * 12/2001 Whitehouse et al. ......... 250/288
2004/0108450 A1 * 6/2004 Makarov et al. .............. 250/281
2004/0119015 A1 * 6/2004 Hashimoto et al. ........... 250/292
2005/0121609 A1 * 6/2005 Makarov et al. .............. 250/290
2005/0167585 A1 * 8/2005 Makarov et al. .............. 250/290
2006/0124845 A1 * 6/2006 Makarov et al. .............. 250/282
2007/0023629 A1 * 2/2007 Makarov ....................... 250/282
2007/0273385 A1 * 11/2007 Makarov et al. .............. 324/464
2008/0315080 A1 * 12/2008 Makarov et al. .............. 250/281

FOREIGN PATENT DOCUMENTS

GB 2 378 312 A 2/2003
GB 2378312 A * 2/2003
GB 2 448 413 A 10/2008
GB 2448413 A * 10/2008

* cited by examiner

*Primary Examiner* — David A Vanore
*Assistant Examiner* — Andrew Smyth
(74) *Attorney, Agent, or Firm* — Robic, LLP

(57) ABSTRACT

In a Kingdon ion trap in which harmonic ion oscillation in a potential well in a longitudinal direction is completely decoupled from ion oscillation in a direction transverse to the longitudinal direction, ions enter the trap via an entrance tube extending through, but electrically insulated from, one of the Kingdon trap housing electrodes and located outside the minimum of the potential well in the longitudinal direction. The geometry of the Kingdon trap is arranged so that the oscillating ions introduced through the entrance tube cannot return to the entrance tube until they have performed several longitudinal oscillations during which time heavy ions can be introduced into the trap.

14 Claims, 6 Drawing Sheets

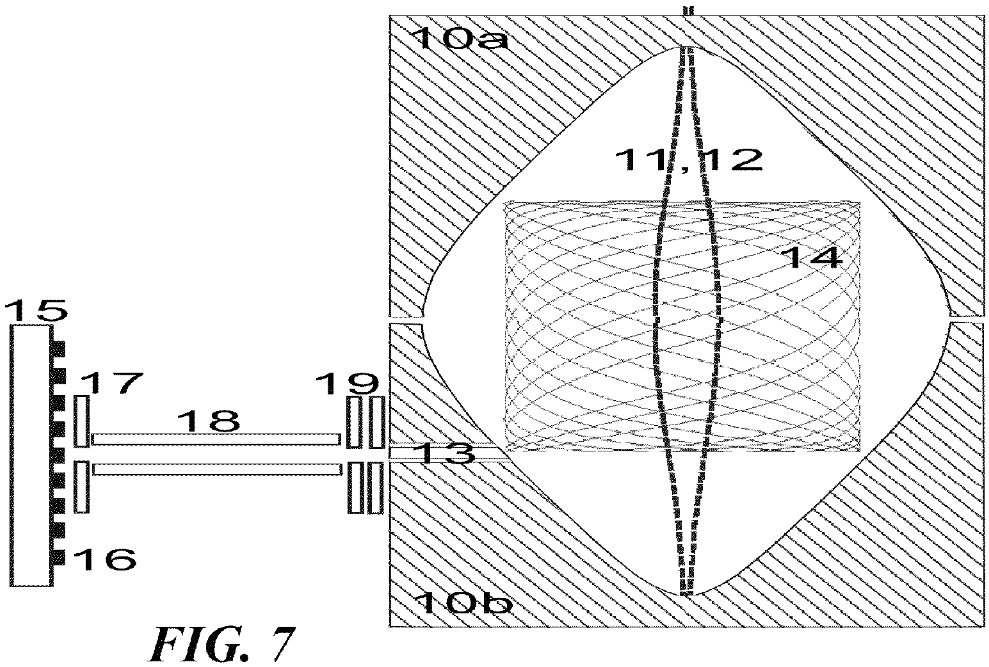
FIG. 7
FIG. 8
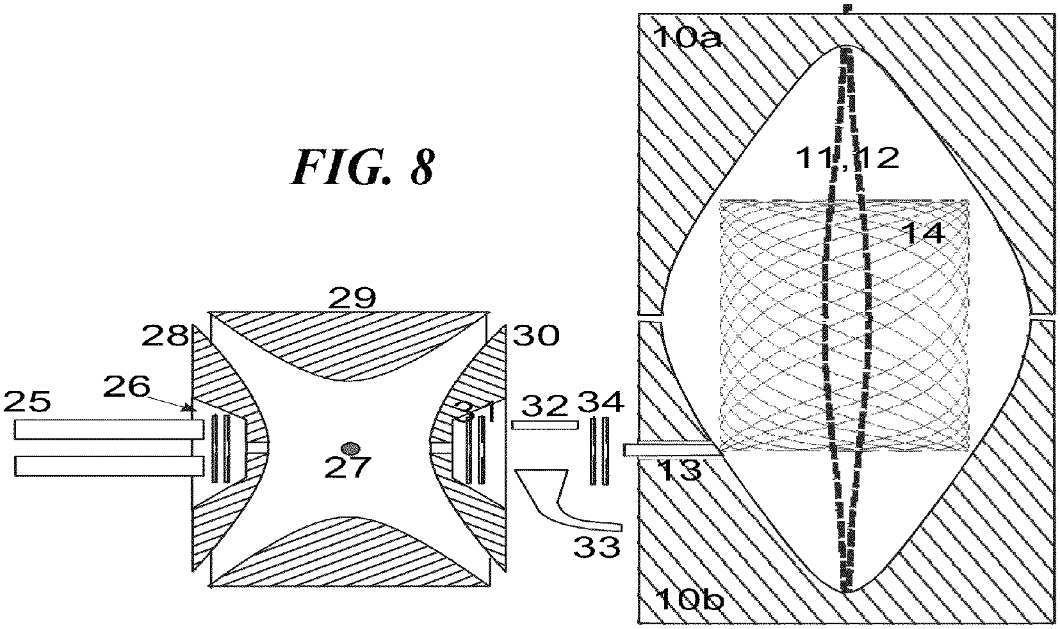

INTRODUCTION OF IONS INTO KINGDON ION TRAPS

BACKGROUND

The invention refers to devices and methods for the introduction of ions into special Kingdon ion traps in which the ions can harmonically oscillate in the longitudinal direction, completely decoupled from their transverse motion. Kingdon traps are electrostatic ion traps in which ions can orbit around one or more inner electrodes or oscillate between several inner electrodes, while an outer, enclosing housing is at a DC potential which the ions with a predetermined total energy cannot reach. In special Kingdon traps particularly suited as mass spectrometers, the inner surfaces of the housing electrodes and the outer surfaces of the inner electrodes are designed so that, firstly, the motions of the ions in the longitudinal direction of the Kingdon trap are completely decoupled from their motions in the transverse direction and, secondly, a parabolic potential profile is generated in the longitudinal direction in which the ions can oscillate harmonically.

In this disclosure, the term “Kingdon trap” refers only to these special forms in which ions can oscillate harmonically in the longitudinal direction, completely decoupled from their transverse motions. These Kingdon ion traps can be used as mass spectrometers by measuring the oscillation frequencies of ions in longitudinal direction.

Kingdon traps must be operated under ultra-high vacuum if ions are to be stored undisturbed for a prolonged time to measure their oscillations. During this time the ions must not suffer any collisions with the residual gas because they would then lose kinetic energy and finally hit the inner electrode arrangement.

If packets of ions move coherently in the longitudinal direction in the parabolic potential profile, the ion packets with different charge-related mass each oscillate with their own, mass-dependent frequencies. The frequencies are inversely proportional to the square root $\sqrt{(m/z)}$ of the charge-related mass m/z. The image currents induced by the oscillating ions can be measured in the form of a time-dependent image current transient in suitable detection electrodes, for example in two half electrodes of a housing which is centrally split. A Fourier analysis of this image current transient produces a frequency spectrum; and the frequency spectrum is then transformed into a mass spectrum. As is the case with other Fourier transform mass spectrometers, such as ion cyclotron resonance mass spectrometers, a very high mass resolution R can be achieved by long measurement times. The precondition is that the shape of the outer and inner electrodes is very precisely manufactured because the harmonic potential profile depends on the shape of these electrodes.

The advantage of Kingdon trap mass spectrometers compared to ion cyclotron resonance mass spectrometers (ICR-MS) with similarly high mass resolutions R consists in the fact that no superconducting magnet is required to store the ions, and so the technical set-up is much less costly. The ions are stored here oscillating or orbiting in a DC field and thus require only DC voltages at the electrodes, although these DC voltages must be kept constant with a very high degree of precision. Moreover, the decrease in resolution R with mass in Kingdon trap mass spectrometers is only inversely proportional to the square root $\sqrt{(m/z)}$ of the charge-related mass of the ions m/z, whereas in ICR-MS the decrease in resolution R is inversely proportional to the mass m/z itself; this means the resolution falls off much more rapidly toward higher masses in ICR-MS.

The patent specification U.S. Pat. No. 5,886,346 (A. A. Makarov) elucidates the fundamentals of a special Kingdon trap which has been marketed by Thermo-Fischer Scientific GmbH Bremen under the name Orbitrap®. The Orbitrap® consists of a single spindle-shaped inner electrode and coaxial housing electrodes transversely split down the center. The housing electrodes have an ion-repelling and the inner electrode an ion-attracting electric potential. With the aid of an ion-optical device, the ions are tangentially injected as ion packets through a hole in the housing electrode and orbit in a hyperlogarithmic electric potential. The kinetic injection energy of the ions is adjusted so that the attractive forces and the centrifugal forces balance each other out, and the ions therefore largely move on almost circular trajectories.

The electric potential of the Orbitrap® has a parabolic potential well in the longitudinal direction, in which the transversely orbiting ions can oscillate harmonically in the longitudinal direction. The ion packets oscillating in the longitudinal direction induce image currents in the hemispherical electrodes of the centrally split housing, and these currents are measured in the form of the image current transient as a function of time. As has been described above, mass spectra can be obtained from these image current transients. The mass resolution of an Orbitrap® is currently around R=50,000 at m/z=1,000 daltons, and even higher for good instruments. The electrodes must be manufactured to a very high degree of mechanical precision. In addition, the introduction (injection) of the ions is critical because the kinetic energy of the ions on injection must only vary within a small tolerance range. The injection technique is complicated and requires that the operating voltage between the outer and inner electrodes be continuously increased during the injection process. This requirement to change the operating voltage is disadvantageous because this operating voltage must remain exceptionally constant, preferably to better than one millionth of its value, during the measurement of the image currents in order to achieve high mass accuracies. The requirement to keep a changeable voltage constant poses special electro-technical problems.

The patent application DE 10 2007 024 858.1 (C. Köster) describes further types of Kingdon trap with several inner electrodes which differ in the way these electrodes are arranged. In this case, as well, the inner electrodes and the outer housing electrodes can be precisely formed in such a way that the longitudinal motion is completely decoupled from the transverse motion and a parabolic potential well is created in the longitudinal direction for a harmonic oscillation. The patent application cited contains the mathematical expressions for the equipotential surfaces inside such Kingdon traps, which also describe the exact outer shapes of the inner electrodes and inner shapes of the housing electrodes, because each of these must form equipotential surfaces of the desired field. The embodiments listed also include those where the analyte ions can oscillate transversely in the center plane between at least one pair of inner electrodes, practically in a single plane. The analyte ions oscillating transversely in this way can then execute harmonic oscillations in the longitudinal direction, and the resulting image currents can then be measured in order to produce the high-resolution mass spectrum.

For all Kingdon traps it is advantageous to introduce the ions at a location in the longitudinal direction outside the potential minimum. The introduced ions then immediately start to oscillate not only in the transverse, but also in the longitudinal direction without having to be particularly excited to these oscillations. The exact location at the outer electrode where the ions are introduced then marks the reversal points of the longitudinal oscillations. No special voltage generator is thus required for the excitation of these oscillations, which means no generator for "chirp" or "synch pulses", as is required for the excitation of the ions in ICR mass spectrometers.

Mass spectrometers can only ever determine the ratio m/z of the ion mass m to the number z of elementary charges of the ion. In the following, the term "mass of an ion" or "ion mass" always refers to the ratio m/z of the mass m to the number z of positive or negative elementary charges of the ion, that is to say the elementary charge-related ("charge-related" for short) mass m/z. Among the key criteria influencing the quality of a mass spectrometer are mass resolution and the mass accuracy. Mass resolution is defined as $R=(m/z)/\Delta(m/z)=m/\Delta m$, where R is the resolution, m the mass of an ion measured in units of the mass scale, and Δm the width of the mass signal at half maximum, measured in the same units. The term mass accuracy relates to both the statistical spread about a measured mean value and the systematic deviation of the measured mean value from the true value of the mass; the latter can be made to disappear by exact calibration.

SUMMARY

In accordance with one aspect of the invention, a narrow electrically insulated entrance tube which completely encloses the ions during their introduction into the Kingdon trap. A voltage generator can switch the entrance tube to different potentials. The entrance tube introduces the ions with low kinetic energy at a potential lower than that of the housing electrodes, not allowing them to reach the housing electrodes after their introduction.

Another aspect of the invention includes rules for the selection of an advantageous ratio of a characteristic length to the diameter of the Kingdon trap ("aspect ratio") in order that the ions introduced, which all move on the same trajectories independent of their mass, can only return to the entrance tube, in longitudinal as well as in transverse position, after several longitudinal oscillations, preferably after about five to ten oscillations. The aspect ratio determines the ratio of the number of transverse oscillation cycles to the longitudinal oscillation cycle.

The invention can be used with Kingdon traps as defined above, in whose DC field ions can oscillate harmonically in the longitudinal direction, completely decoupled from any type of motion in the transverse direction. For example, the invention may be used with Kingdon traps in which the ions can oscillate transversely in a center plane between one or more pairs of inner electrodes, as described in detail in DE 10 2007 024 858 A1 (C. Köster). These ion traps may be called "Kingdon oscillational ion traps", or "oscillational traps" for short, in the text below. Alternatively, Kingdon traps of the Orbitrap® type disclosed in U.S. Pat. No. 5,886,346 (A. A. Makarov) may serve as bases for the invention. This trap may be referred to as "Kingdon orbital ion traps", or "orbital traps" for short, in this description.

In different embodiments, the entrance tube can be cylindrical, conical, or box-shaped, with circular or rectangular cross-sections, and has preferably, at least at its end, an internal diameter which is small relative to the diameter of the Kingdon trap, for example between 1/20 and 1/100 of the maximum inside diameter of the housing electrodes. The tube should be as short as possible. It preferably has a thin wall in order to disturb the potential in the interior of the Kingdon trap as little as possible; for example, a wall thickness equivalent to around 1/5 to 1/20 of its inside diameter. It is electrically insulated and protrudes through the outer housing electrode as far as the interior of the Kingdon trap, and the shape of the end surface should follow the inner contour of the housing electrode. The entrance tube is located outside the minimum of the longitudinal potential well, i.e. outside of the plane of symmetry of the Kingdon trap in the longitudinal direction, namely as far from the plane of symmetry as the ions in the interior should oscillate.

In oscillational traps, the entrance tube may be located in the center plane of the inner electrodes, i.e. in the plane in which the ions should oscillate transversely, pointing to the axis of the oscillational trap. A location a little outside this plane may even prolong the phase for ion introduction. In orbital traps, the entrance tube passes through the hemisphere of the housing electrodes approximately tangentially to the desired orbital motion of the ions. In both cases, the entrance tube can be set approximately to the potential of the housing electrodes, on the one hand, and to an intermediate potential, which is about five to fifteen percent closer to the potential of the inner electrodes, on the other hand.

A method of ion introduction into an oscillatory Kingdon trap starts with the generation of an ion cloud, whose maximum diameter is about as large as the minimum inside diameter of the entrance tube. The method initially accelerates the ions of the ion cloud, decelerates them again in front of the entrance tube in a suitable ion-optical arrangement, and injects them with low kinetic energy of only a few tens of electronvolts through the narrow entrance tube into the Kingdon trap. The entrance tube is at the intermediate potential here.

After entering the Kingdon trap, the ions immediately move in both the transverse and the longitudinal direction, forming a complicated ion trajectory. A favorable geometric aspect ratio of the Kingdon trap according to the invention means the ion trajectory only closes again after several oscillations in the longitudinal direction, say around 10, for example, so that the ions only then get close to the tube and can be destroyed there by contact.

As the ions are transferred, the path between ion cloud and Kingdon trap causes the ions to be spaced out according to their mass by the mass-dependent flight times in the electric acceleration, deceleration and focusing fields; the lighter ions reach the Kingdon trap earlier than the heavier ions. By means of the time it takes for the ion trajectories to close, and by means of a high intermediate acceleration of the ions during the transfer to the Kingdon trap, it is possible for the heaviest ions of interest to also be introduced before the lightest ions in the Kingdon trap can again reach the entrance tube. If the potential of the entrance tube is then switched back to the potential of the outer electrodes, all the ions remain firmly trapped on their trajectories within the Kingdon trap because they do not have enough kinetic energy to reach the housing electrodes.

If the Kingdon trap is to be emptied again after the longitudinal oscillations have been measured, this can be achieved by a suitable drawing potential at the entrance tube or at a special extraction electrode, with a similar shape, for example.

This type of ion introduction and emptying according to the invention means that the operating voltage between the outer and inner electrodes of the Kingdon trap never needs to be changed during long operating periods, but can be kept constant for all phases of the operation. It is thus significantly easier to develop a voltage generator which supplies this voltage with high constancy and an accuracy of better than one millionth of this voltage.

The small ion cloud can, for example, be produced by laser desorption from a solid sample and also by collecting analyte ions from any type of ion source in two-dimensional or three-dimensional Paul traps. The coupling of Kingdon traps according to the invention with Paul traps gives rise to interesting types of tandem mass spectrometer in which ions are fragmented or otherwise reactively changed in a wide variety of known ways in the Paul traps, in order to analyze their structure, for example.

BRIEF DESCRIPTION OF THE DRAWINGS

FIG. 7 shows an oscillational ion trap for operation with ionization of samples (16) on a sample support (15) by matrix-assisted laser desorption (the laser is not shown), which produces the small cloud of ions that is required for introducing the ions. The ions of the ion cloud are directed through an acceleration lens (17), an ion guide (18) and another acceleration lens (19) to the input aperture of the entrance tube (13) and injected through the entrance tube into the oscillational ion trap.

FIG. 8 shows the same oscillational ion trap, but in this case coupled to a three-dimensional high precision Paul trap which comprises two rotationally hyperbolic end cap electrodes (28, 30) and one rotationally hyperbolic ring electrode (29). Ions can be introduced via the ion guide (25) and the ion lens (26) into the interior of the Paul trap, where they are formed into a small ion cloud (27) by a damping gas which damps the oscillating motions of the introduced ions. By switching on an extraction voltage at the end cap electrode (30), the ions of the ion cloud (27) can be extracted from the Paul trap and focused, before being accelerated to an ion beam by lenses (31) and (34) and injected through the entrance tube (13) into the oscillational ion trap. The conversion dynode (32) and the secondary electron multiplier (33) mean that the Paul trap can also be operated in the usual way as an independent mass spectrometer, but with a much lower mass resolution.

DETAILED DESCRIPTION

Figure 1:
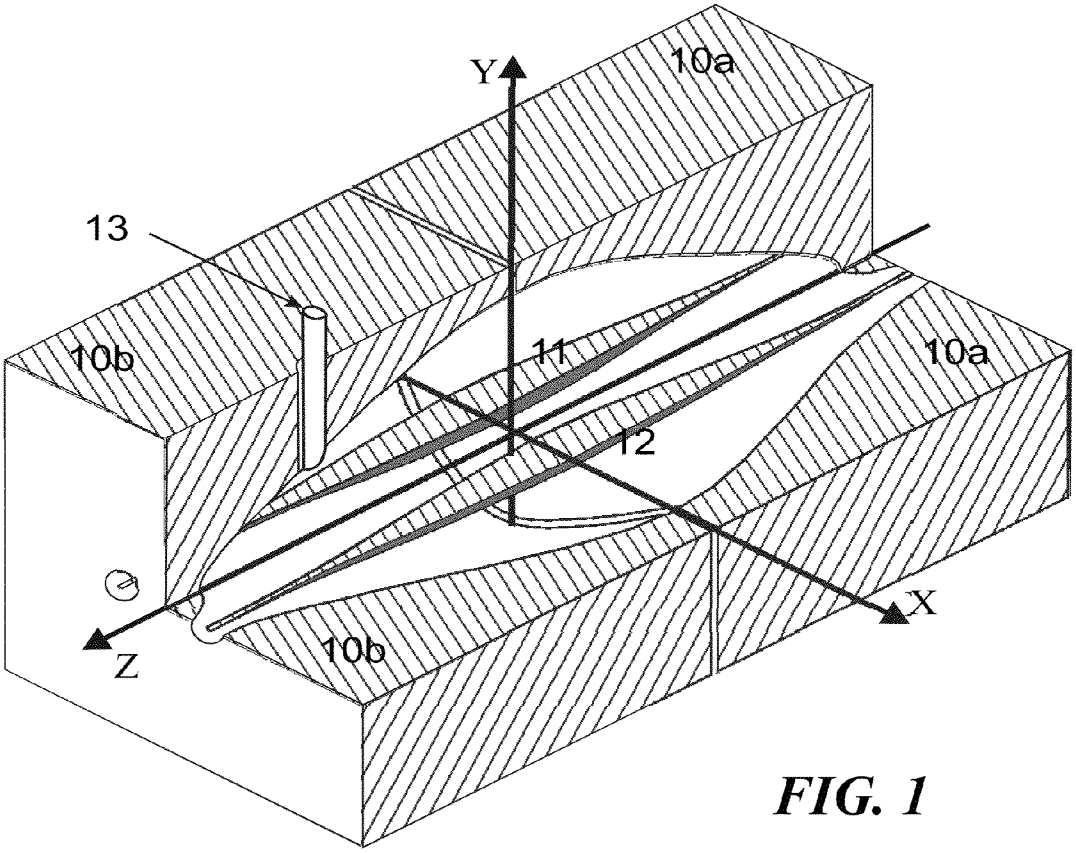
FIG. 1 shows an electrostatic Kingdon trap of the oscillational type with a housing electrode transversely split in the center into two halves (10*a*) and (10*b*) and two spindle-shaped inner electrodes (11, 12) in a three-dimensional representation showing the transverse coordinate directions x and y and the longitudinal coordinate direction z. The entrance tube according to the invention (13) is electrically insulated and penetrates the half housing electrode (10*b*); its end is shaped so that its end surface follows the contours of the inner shape of the half housing electrode (10*b*).
Figure 2:
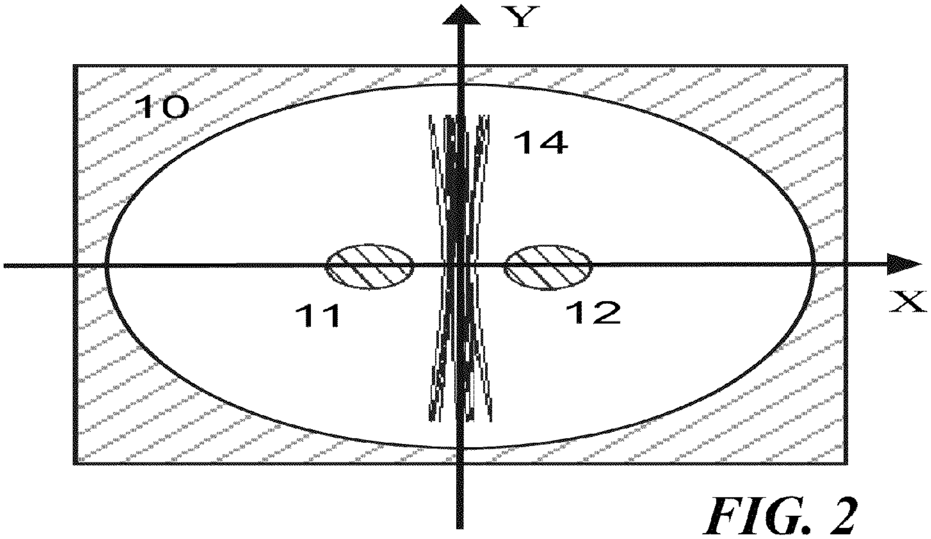
FIGS. 2 to 4 show the Kingdon trap from FIG. 1 in the x-y-plane, x-z-plane, and y-z-plane. The trajectories (14) of stored ions, which are oscillating in the transverse y-direction and oscillating harmonically in the longitudinal z-direction, are also shown schematically as projections onto the respective image plane.
Figure 3:
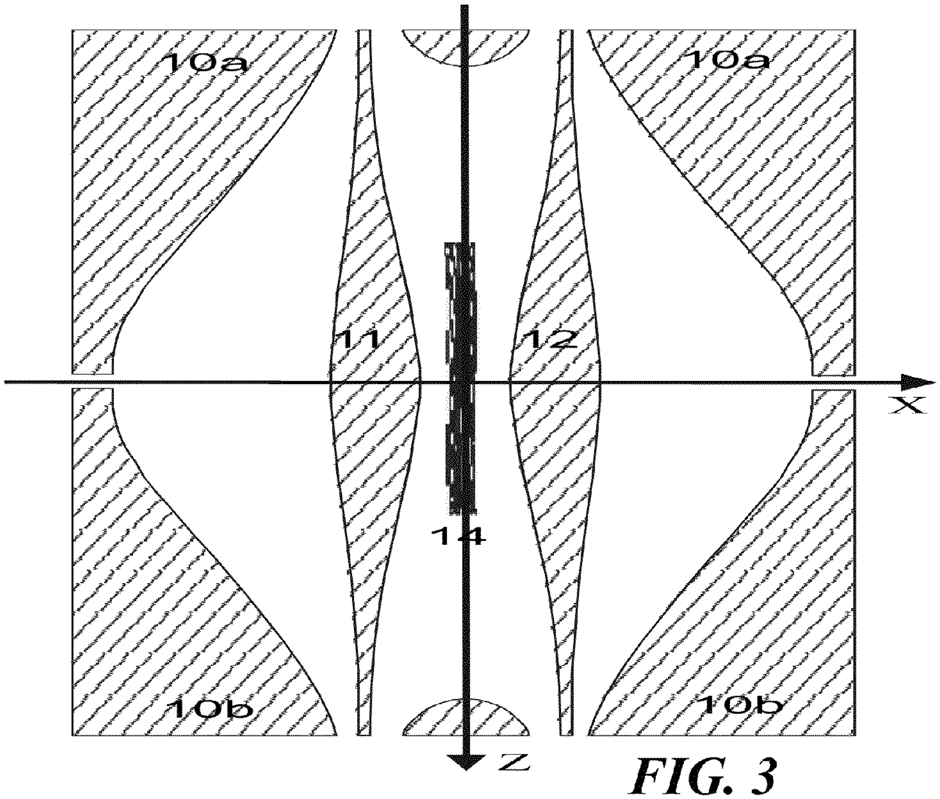

While the invention has been shown and described with reference to a number of embodiments thereof, it will be recognized by those skilled in the art that various changes in form and detail may be made herein without departing from the spirit and scope of the invention as defined by the appended claims.

The invention is used with Kingdon traps, as defined above, in which ions can oscillate harmonically in the longitudinal direction, completely decoupled from any type of motion in the transverse direction. The Kingdon traps are electrostatic ion traps; between their housing electrodes and the inner electrodes there is a constant operating voltage ΔU of several kilovolts. As described above, two types of such Kingdon traps can be used. In one type, here designated as the "oscillational trap", the ions can oscillate transversely in a center plane between one or more pairs of inner electrodes, as is described in detail in the patent application DE 10 2007 024 858 A1 (C. Köster). The other type comprises Kingdon traps of the Orbitrap® type, as have been disclosed in the patent specification U.S. Pat. No. 5,886,346 (A. A. Makarov), and which are called "orbital traps" for short in this description.

We initially describe an embodiment using an oscillational trap in which the ions can oscillate transversely in a center plane between one or more pairs of inner electrodes, and which has a potential well in the longitudinal direction for harmonic oscillations of the ions, transverse and longitudinal oscillations being completely decoupled.

FIGS. 1 to 4 illustrate one type of such a Kingdon oscillational ion trap with two inner electrodes (11, 12) and a housing electrode which is transversely split through the center into two halve electrodes (10*a*, 10*b*) in both a three-dimensional representation (FIG. 1) and in the three spatial cross-sections (FIGS. 2 to 4), where the transverse and axial ion trajectories (14), which both lie almost flat in a plane, are schematically represented.

The invention consists, firstly, in equipping this Kingdon oscillational ion trap with a narrow and short entrance tube (13) for the ions. The method according to the invention allows the ions to be injected with low energy through this entrance tube (13) into the Kingdon trap. This entrance tube can be cylindrical or conical in shape, preferably with the narrow conical end pointing to the interior of the Kingdon cell. The cross section can be circular, ellipsoidal, rectangular or any other shape.

This entrance tube (13) preferably has, at its narrowest cross section, a small inside diameter relative to the diameter of the Kingdon trap; for example, about one millimeter for a 50 millimeter maximum internal diameter of the housing electrodes. The entrance tube (13) preferentially has a thin wall 0.1 millimeter thick, for example, and is electrically insulated in a channel with a diameter of around 1.5 millimeter in one of the hemispheres of the outer housing electrode, here in hemisphere (10*b*). It extends just as far as the interior of the Kingdon trap and its end surface follows the contour of the inner surface of the housing electrode (10*b*). In the longitudinal direction, the entrance tube (13) is located outside the minimum of the longitudinal potential well, i.e. outside the plane of symmetry in the longitudinal direction (z-direction) of the Kingdon trap, namely as far from the plane of symmetry as the ions in the interior should oscillate. For an oscillational trap where the housing electrodes have an inside diameter of 50 millimeters and a length of around 100 millimeters, the entrance tube can be around 25 millimeters away from the plane of symmetry, for example; this results in a longitudinal amplitude of oscillation of around 50 millimeters.

The entrance tube (13) may be located exactly in the center plane of the two inner electrodes (11) and (12), i.e. in the plane in which the ions oscillate transversely in the y-direction; it can also be located slightly away from this x-y plane. It preferably points directly toward the longitudinal axis (z) of the Kingdon trap. If the entrance tube is located slightly outside the x-y plane, the plane of motion of the ions also slightly oscillates around the z axis, as FIG. 2 indicates.

The entrance tube (13) is connected to a voltage generator which can set the entrance tube to, on the one hand, approximately the potential of the housing electrodes (10) and, on the other hand, an intermediate potential which is between the potential of the housing electrodes (10) and that of the inner electrodes (11, 12), namely between five and fifteen percent, preferably around ten percent, of the operating voltage ΔU away from the potential of the housing electrodes (10). Thus, for operating voltages ΔU of one to ten kilovolts between the housing electrodes (10) and inner electrodes (11, 12), voltage differences of around a hundred to a thousand volts between the housing electrodes (10) and entrance tube (13) are applied to the entrance tube. For preferred operating voltages ΔU of three to five kilovolts between housing electrodes and inner electrodes, the entrance tube preferably has a voltage of 300 to 500 volts with respect to the housing electrodes.

Figure 10:
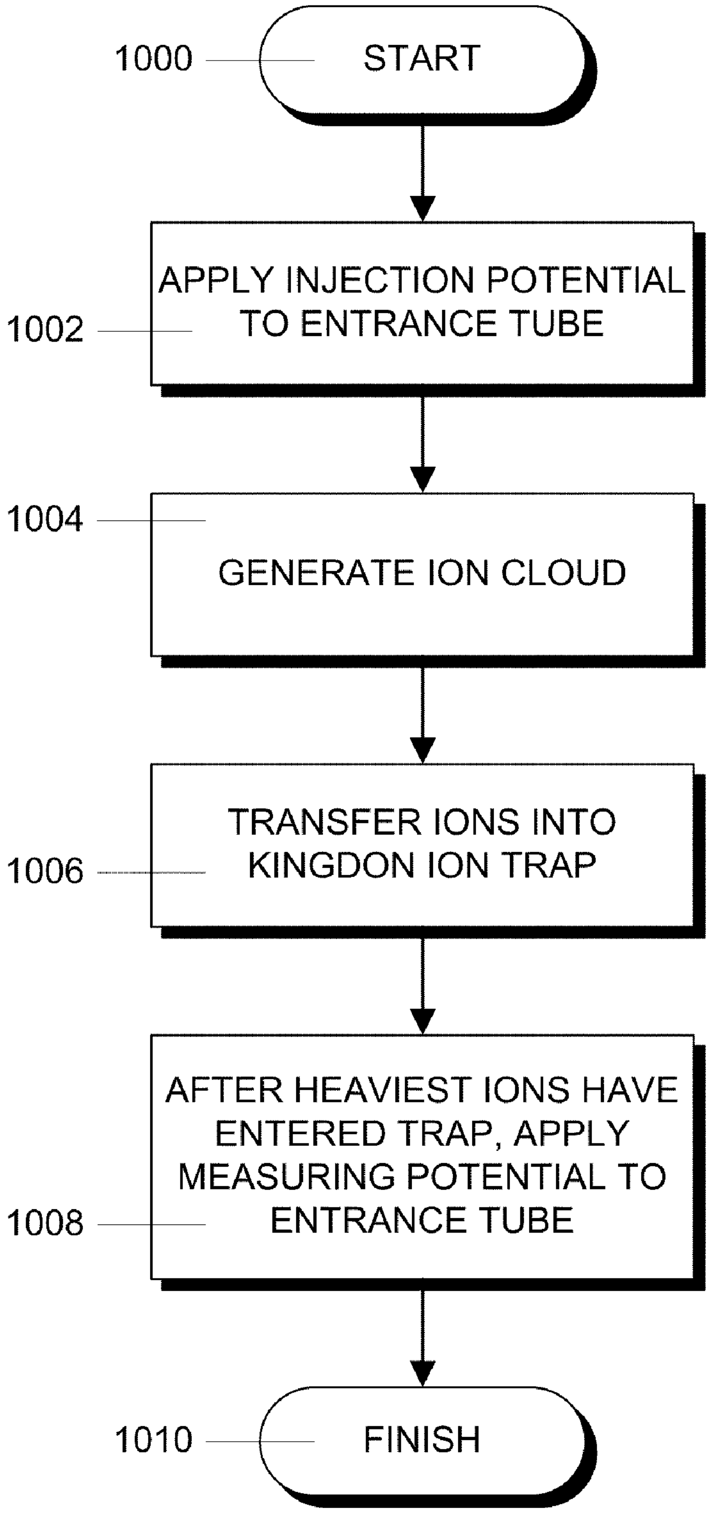
FIG. 10 is a flowchart showing an illustrative ion introduction method in accordance with the principles of the invention.

An illustrative ion introduction method is illustrated in the flowchart shown in FIG. 10. This method starts in step 1000 and proceeds to step 1002 where an injection potential which differs from the operating voltage ΔU by five to twenty percent of the operating voltage is applied to the entrance tube of a Kingdon ion trap of the type described above. Next, in step 1004, an ion cloud is generated. Then, in step 1006, ions from the ion cloud are transferred through the entrance tube into the Kingdon trap. In step 1008, after the heaviest ions of interest have entered the Kingdon trap, a measuring phase potential which differs from the operating voltage ΔU by a maximum of five percent of the operating voltage is applied to the entrance tube. The method then finishes in step 1010.

The ion introduction method according to the invention is based on the, at least temporary, existence of a spatially small ion cloud having a diameter which is preferably only about as large as the inside diameter of the entrance tube (13) or even smaller. Such small ion clouds can be produced, for example, by matrix-assisted laser desorption (MALDI), from samples (16) on a sample support (15), as shown in FIG. 7. In order to not make FIG. 7 too complicated, the laser for pulsed UV emission is not shown. Such a laser-desorbed plasma cloud of ions is of a temporary nature, however, because they expand without limit by a kind of explosive expansion into the surrounding vacuum. They therefore have to be extracted by accelerating electrodes (17) and transported to the entrance lens (19) within the first nanoseconds, or microseconds at the latest, after their formation. They are then decelerated again to the entrance energy in order to pass through the entrance tube (13) and enter the oscillational ion trap. The principle of this technique is known to the mass spectrometric expert from MALDI time-of-flight mass spectrometers.

The small ion clouds required can, however, also be produced in two-dimensional or three-dimensional Paul RF ion traps. FIG. 8 shows a three-dimensional ion trap with two end cap electrodes (28, 30) and one ring electrode (29). Ions from any type of ion source can be guided to the ion trap via an ion guide (25) and injected through the acceleration lens (26). The ions oscillate in the interior in the familiar way under the influence of the pseudopotential; their motions are then decelerated by a damping gas at a pressure of around 0.01 Pascal in around one millisecond to such an extent that they collect as a small ion cloud in the center of the ion trap. The diameter of the cloud is determined by the centripetal effect of the pseudopotential, which is proportional to the RF voltage applied, and by the centrifugal effect of the Coulomb forces. Accumulations of a few ten thousand ions, as is advantageous for Kingdon traps, result in ion cloud diameters of around one millimeter in ion traps of conventional size at moderate RF voltages of a few kilovolts.

This small ion cloud in the Paul trap can be removed by an extraction voltage suddenly applied to the end cap electrode (30), causing a focusing effect to act on the cloud and reduce its diameter further. After being accelerated and then decelerated again by the acceleration lenses (31) and (34), the ions can be introduced through the entrance tube (13) and into the oscillational ion trap while the entrance tube (13) is at the intermediate potential.

In order to transfer the ions quickly from the point where the ion cloud is formed to the opening of the entrance tube (13), the ions of this ion cloud are first accelerated by the potential of the end cap electrode (30) and the acceleration lens (31), and decelerated again in front of the entrance tube (13) in a suitable ion-optical arrangement (34). Despite acceleration and deceleration, the ions are separated according to mass during the transfer by the different times of flight; the light ions reach the Kingdon trap earlier than the heavy ions.

The extraction of the ions from the ion cloud in the Paul trap can also be conducted in such a way that the ions can be focused according to their mass so that ions of all masses enter the Kingdon trap at about the same time. This requires that the extraction voltage is not increased suddenly, but slowly over a period of ten to thirty microseconds. Since the heaviest ions in the Paul trap are trapped the least strongly, they leave the Paul trap first. The method can be refined so that the heavy ions are sent earlier on their way to the Kingdon trap and are then caught up by the faster, lighter ions just as they enter. However, the process of extraction from the Paul trap then gives the ions of the individual masses a larger spread of kinetic energies; they are therefore smeared over several transverse oscillations, but this is not unfavorable for the measurement of the longitudinal oscillations.

For all Kingdon traps with an entrance tube, the kinetic energy of the ions on entry should be significantly less than the kinetic energy that results from an acceleration by the voltage difference between entrance tube (13) and housing electrodes (10). If, for example, the housing electrodes are at ground potential and the inner electrodes at minus three kilovolts for the capture of positive ions, then the entrance tube is preferably at a potential of minus 300 volts, and the ions are preferably injected with an energy of about 150 electronvolts. Even when the kinetic energy of the ions has a relatively large spread of around plus/minus 100 electronvolts, the ions in the interior of the oscillational ion trap cannot reach the housing electrodes at any point other than the location of the entrance tube. A spread of the ions' kinetic energies helps to smear out the ions over at least part of a translational motion cycle, which is advantageous for the measurement of the longitudinal oscillation by image currents.

Figure 4:
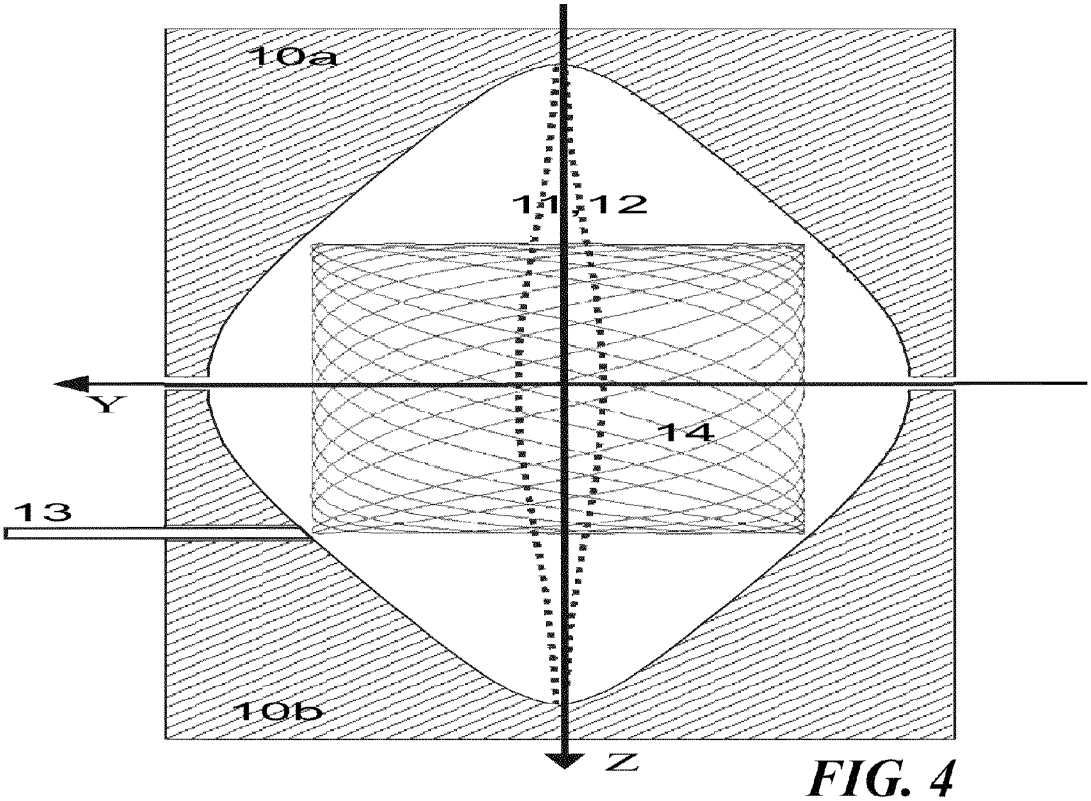

After entering one of the oscillational ion traps of FIG. 7 or 8, the ions immediately oscillate in both the transverse and the longitudinal direction in the form of a type of Lissajous figure that extends over a rectangle (see (14) in FIG. 4, 7, or 8), in one corner of which is the end of the entrance tube (13). Since the oscillatory motion in the transverse direction is usually not harmonic, the Lissajous figures are somewhat distorted. Since the electric field in the interior of the Kingdon trap is constant over time, all ions with the same initial kinetic energy follow exactly the same trajectories, independently of their mass, but with different mass-dependent velocities. In order to have sufficient time to also store the heavy ions after the light ions have entered, without the light ions being able to leave the Kingdon trap again, the Lissajous figures must be formed in such a way that the ion trajectories can only reach the entrance tube again after several, preferably about ten, oscillations in the longitudinal direction. It is easy to shape Lissajous figures in this way simply by virtue of the geometric aspect ratio of the Kingdon trap, or to be more precise, by the ratio of length to diameter of the interior of the oscillational trap. By designing a favorable aspect ratio, the Lissajous figure can be made to close only after several oscillations, say ten for example, in the longitudinal direction so that the ions can only then come close to the tube and be destroyed by impingement on its wall.

In Kingdon traps the ratio of the transverse to the longitudinal frequencies of oscillation is about 2:1 to about 6:1. With an integral ratio of 2:1, and also for an integral ratio of 3:1, 4:1, 5:1 or 6:1, the Lissajous figure closes again after a single longitudinal oscillation, and the ions can be destroyed after this single longitudinal oscillation. This is unfavorable because then only very little time remains to also introduce heavier and slower ions into the Kingdon trap without the light ions being discharged at the end surface of the entrance tube by contact.

In order to gain a longer time for the introduction of the heavier ions, it is advantageous to have exactly $(n\times k+1)/n=k+(1/n)$ transverse oscillations during one longitudinal oscillation, n and k being integer numbers. The Lissajous figure then closes again exactly after $n\times k+1$ transverse and n longitudinal oscillations. For example: if one achieves (with $k=4$ and $n=10$) precisely 4.1 transverse oscillations per longitudinal oscillation, the Lissajous figure closes only after 41 transverse oscillations, which is equal to 10 longitudinal oscillations. The ions can only be lost after 10 longitudinal oscillations because only then do they again reach the vicinity of the entrance tube.

The ratio of the frequencies of oscillation can be set by the aspect ratio, i.e. by the ratio of the length to the diameter of the interior of the oscillational ion trap. An advantageous aspect ratio for an oscillational ion trap can be designed relatively easily and very successfully with one of the customary simulation programs for ion motions in any electrode arrangements (e.g. SimIon). These programs are well-known to those skilled in the art of mass spectrometry. The mechanical shape of the oscillational ion trap is thus only designed after these simulation experiments.

Despite the mass separation resulting from the different flight times, the designable length of time until the Lissajous figure closes and the intermediate acceleration of the ions from the ion cloud, which reduces the differences in the flight times, make it possible for the heaviest ions of interest to be introduced before the first ions of the Kingdon trap are destroyed. If the potential of the entrance tube is then again switched to the potential of the outer electrodes, all the ions remain firmly trapped on their complicated oscillating trajectories, which are mainly in one plane.

A further prolongation of the time of ion injection can be achieved by changing the injection voltage during the ion injection. The change may be continuously or stepwise. If the potential difference between the tube potential and the housing potential is slowly diminished, the oscillating ions cannot reach again the tube wall even if the Lissajous figure is closed. It is then favorable to likewise diminish the kinetic energy of the ions, i.e., the potential of the ion cloud which is transferred into the Kingdon trap should be changed correspondingly.

Furthermore, the additional motion in the x-direction caused by not inserting the entrance tube precisely in the plane between the inner electrodes of the oscillational trap can be used to extend the time until the ions return to the entrance tube.

In the descriptions above, the potential applied to the entrance tube for the measuring phase was only "approximately" equal to the potential of the housing electrodes. It is better to select a potential which deviates a little (about five percent of the operating voltage ΔU at most) from the potential of the housing electrodes in order to bring the electric field in the vicinity of the entrance tube, whose aperture slightly disturbs the field, back to its theoretically ideal form, as far as possible. This corrective potential at the entrance tube will be termed "measuring phase potential".

Before measuring the longitudinal oscillations, when the measuring phase potential is applied, it can be advantageous to use an "interfering potential" at the entrance tube to smear the ions of one mass over roughly one cycle of the transverse motion, if possible, in order to reduce the influence of this motion on the measurement of the image currents.

With this type of ion introduction it is possible to achieve a situation where the operating voltage of the Kingdon trap does not have to be changed during the introduction and measurement phases. There is, however, still the phase of emptying the oscillational trap of all the ions in it. In order that the operating voltage between the housing electrode and inner electrodes does not need to be changed in this phase either, the obvious thing to do is to perform the emptying by applying an "emptying voltage" to the entrance tube. This voltage can preferably deviate even more strongly from the potential of the housing electrodes in order to catch all passing ions and discharge them by impacting on the end surface. This requires n longitudinal oscillations in order for all the ions to pass the entrance tube and be extracted, but this time n oscillations of the heaviest ions; to be certain, however, one waits for the length of time taken to complete 2 n or 3 n longitudinal oscillation cycles of the heaviest ions.

Figure 5:
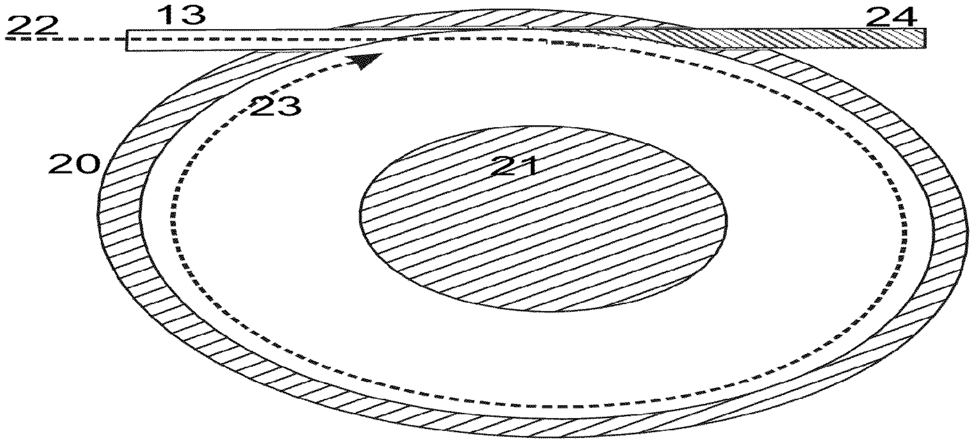
FIGS. 5 and 6 depict a Kingdon trap of the orbital type with housing electrode (20) and inner spindle electrode (21) in two different cross-sections. The entrance tube (13) here leads tangentially through the housing electrode (20). The introduced ion beam (22) executes motions (23) in the interior of the orbital trap which appear circular in the transverse direction but also simultaneously oscillate harmonically in the longitudinal direction. As can be seen from FIG. 6, the ions do not return to their starting point after the first longitudinal oscillation, so the ions here do not get close enough to the entrance tube (13) to be able to reach it and make contact. Since the ion trajectory (23) returns close to the entrance tube again only after several periods of the longitudinal oscillation, there is sufficient time until then to also introduce heavier ions.
Figure 6:
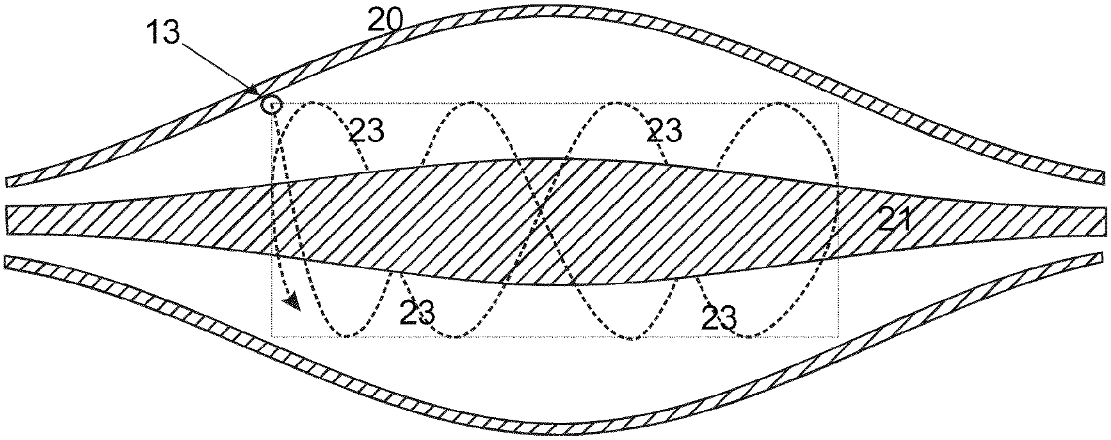

Analogous approaches apply to the introduction of ions into an orbital trap, except that, in this case, the mean kinetic energy on injection corresponds to that which keeps the ions on the desired orbit. Such an orbital trap is shown in FIGS. 5 and 6. Here, also, the number of transverse orbits $(n\times k+1)$ of the ions in relation to the number n of their longitudinal oscillations can be selected by means of the aspect ratio of the orbital trap. The aspect ratio here again refers to the ratio of a characteristic length to the maximum inside diameter of the housing electrodes. The characteristic length can, for example, be given here by the separation of the two z-coordinates at which the housing electrodes have an inside diameter which precisely corresponds to half the maximum inside diameter. For this orbital trap it can be advantageous, for example, to use the aspect ratio to select exactly 4.2 transverse orbits to one longitudinal oscillation because, then, the ions reach the end surface of the entrance tube again, and can be destroyed here by discharging, only after five longitudinal oscillations. If the entrance tube is switched to the potential of the housing electrodes (or to an analogously defined "measuring phase potential") shortly beforehand, the ions remain trapped.

In FIG. 5 it can be clearly seen that the entrance tube (13) in the interior of the orbital trap is cut at a steep angle, creating a channel through which the ions enter. In the channel, the attractive electric field originating from the inner electrode already exerts a weak effect and bends the ion beam approximately in such a way that it tangentially approaches the course of the orbital motion. If the ideal trajectory of the orbit is not completely achieved, a potential can be set by using an additional auxiliary electrode (24) which brings the ions precisely to their orbit. This auxiliary electrode (24) can, however, also particularly be used to remove the ions from the orbital trap again once measurement of the image current transient is complete. This involves the application of a special emptying potential. The emptying again takes at least n periods of the longitudinal oscillation of the heaviest ions, but avoids any change to the highly constant operating voltage between housing electrode and inner electrode.

Figure 9:
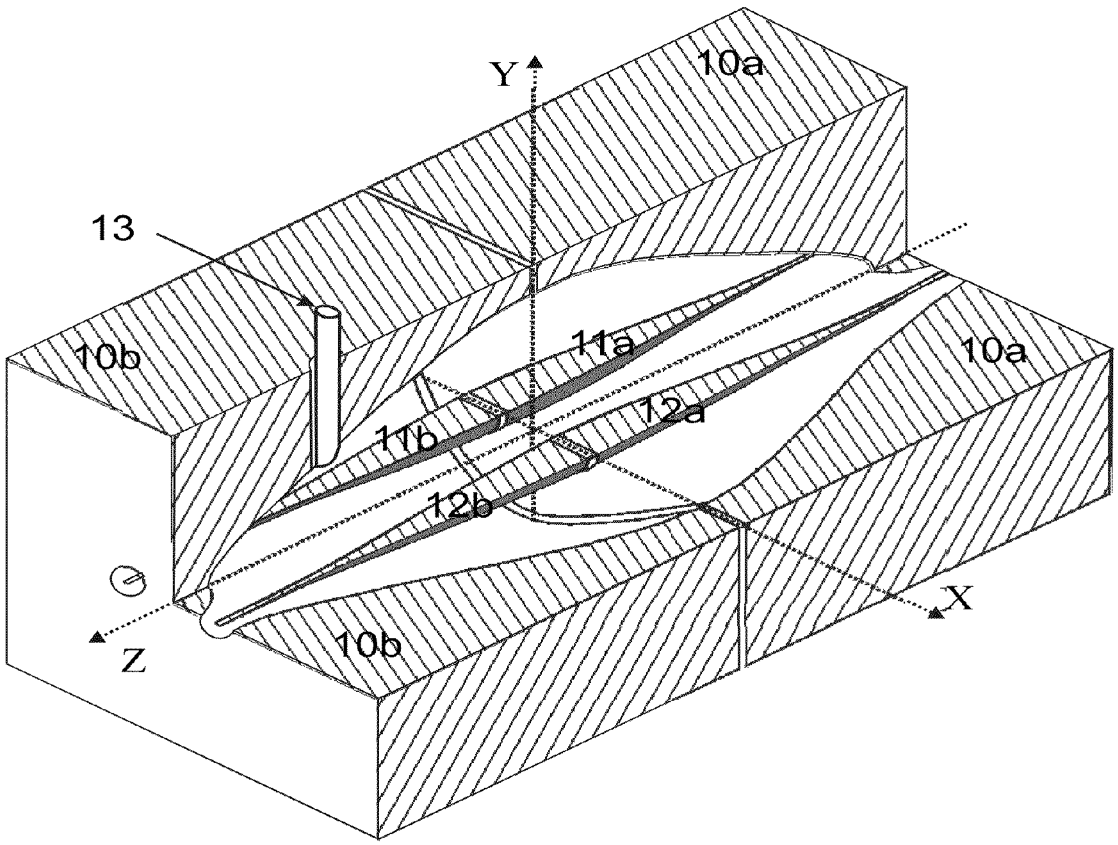
FIG. 9 shows the Kingdon oscillational trap from FIG. 1, where not only the outer electrodes (10*a*, 10*b*), but also the inner electrodes are each split centrally into two halves (11*a*, 11*b*) and (12*a*, 12*b*) in the longitudinal direction in order to use them to also measure the image currents which are induced by the ions oscillating in the longitudinal direction z.

For measuring the image current transients in both types of Kingdon trap, the housing electrodes are transversely split, centrally in the longitudinal direction, into two halves, such as the halve electrodes (10*a*, 10*b*) of the oscillational trap. Both halves of the housing electrodes are preferably at ground potential and serve as detection electrodes for the image currents. It is also possible for the housing electrodes to be at a high, ion-repelling ambient potential, while the inner electrodes (12, 13) are at ground potential, and with their central transverse split, are connected to the image current amplifier for the measurement of the ion oscillations in the longitudinal direction z. This type of oscillational trap with inner electrodes centrally split into halves (11*a*, 11*b*) and (12*a*, 12*b*) is shown in FIG. 9.

The temporal constancy of the operating voltage allows a further mode of operation which measures both the image currents induced on the housing electrodes and the image currents on the inner electrodes. For this, one of the two very sensitive image current measuring devices with image current amplifier and digitizer must be put at a high potential, which is only possible if this potential is constant in time. This is achieved by this invention, however. The image current transients from the two measurements can be evaluated separately, but can also be added together, if necessary with weighting, before the Fourier analysis in order to reduce the influences of transverse oscillations on the image currents.

In a preferred embodiment, the transversely split housing electrodes are essentially at ground potential and the arrangement of inner electrodes is at an ion-attracting potential, for example between minus one to minus ten kilovolts for positive analyte ions; especially favorable is a potential of about minus three to five kilovolts. In oscillational traps, it is not essential that the inner electrodes are all at the same potential if the shape of all the electrodes is correspondingly adapted. In the preferred embodiments, all the inner electrodes are at the same potential, however.

Higher operating voltages $\Delta U$ between inner and housing electrodes result in an improved mass resolution, but also make it more problematic to develop a voltage generator with high operating stability. As has been stated, the operating voltage must be kept extremely stable; a mass precision of one millionth of the mass (1 ppm) requires an operating voltage $\Delta U$ which is at least equally stable.

FIG. 8 represents an especially interesting arrangement in which a Paul RF ion trap (28, 29, 30) is coupled to a Kingdon oscillational ion trap (10*a*, 10*b*, 11, 12). The Paul trap can be loaded with ions from any type of ion source: electrospray ion sources (ESI), ion sources with chemical ionization at atmospheric pressure (ACPI), ion sources with photoionization at atmospheric pressure (APPI), or ion sources with matrix-assisted laser desorption (MALDI). The Paul trap shown in FIG. 8 can also be used to analyze the ions without the aid of the Kingdon oscillational ion trap, by mass selective ejecting the ions in the known way and measuring them by the arrangement of conversion dynode (32) and secondary-electron multiplier (33). The disadvantage of this type of mass analysis, however, is its limited mass resolution; a satisfactory quality of mass resolution can only be achieved by coupling the Paul trap to the Kingdon trap.

The Paul trap has the great advantage that, in its interior, the ions can be fragmented or otherwise reactively manipulated in a wide variety of ways by different types of reaction in order, for example, to better identify the structure of the ions from the fragment ions or the reaction products. In the interior of the Paul trap, parent ions can be selected and isolated in the known way, by removing all other ions. The parent ions can then be fragmented using a number of different methods, such as collisions with the molecules of a collision gas (CID=collisionally induced dissociation), collisions with atomic ions of opposite polarity, or fragmenting reactions with suitable ions of different polarity (ETD=electron transfer dissociation). The masses of the daughter ions from these fragmentations can then be measured in the Kingdon trap with high mass resolution and high mass accuracy, and provide information on the structure of the ions, for example information on the sequence of the amino acids in protein ions.

A particularly advantageous mass spectrometer using the Kingdon traps according to the invention can therefore comprise not only the Kingdon trap itself but also an ion source and a Paul trap, from which the ions are transferred to the entrance tube of the Kingdon trap. In the Paul trap, the ions can be stored temporarily, selected according to their mass and isolated, fragmented in a variety of ways, or reactively changed.

The Kingdon traps used here are relatively small in order to prevent the voltages between the electrodes from becoming too large. The separation between the two inner electrodes (12, 13) of an oscillational ion trap is thus preferably less than 50 millimeters, and preferably only about 10 millimeters. The maximum internal diameter of the housing electrodes (10*a*, 10*b*) is preferably less than 200 millimeters; a diameter of around 50 millimeters is advantageous. An advantageous length for the housing electrodes is less than 200 millimeters, preferably around 100 millimeters. A mass spectrometer for this invention can therefore be very compact.

The size of the configuration is fundamentally determined by the ultrahigh vacuum system required, however. A pressure difference of about six orders of magnitude must therefore be maintained between the two ion traps of FIG. 8. A pressure of around $10^{-2}$ Pascal must be maintained in the Paul trap, and around $10^{-8}$ Pascal in the Kingdon trap. This can only be achieved if at least two differential pressure stages are inserted between the two ion traps with the smallest possible wall openings for the passage of the ions.

For persons skilled in the art, it is very simple to derive further interesting applications using the methods according to the invention for the introduction of ions into Kingdon traps of the types specified in the invention. These shall also be covered by this patent protection application for the part which is subject to this invention.

What is claimed is:

1. A Kingdon ion trap comprising:

housing electrodes extending in a longitudinal direction;

inner electrodes spaced from the housing electrodes in a direction transverse to the longitudinal direction, the housing electrodes and the inner electrodes being shaped so that ions introduced into the trap can oscillate harmonically in a potential well in the longitudinal direction and independently oscillate in the transverse direction when a DC electric field is established between the housing electrodes and the inner electrodes; and an entrance tube that extends through one of the housing electrodes and is insulated therefrom and allows ions to enter the ion trap.

2. The Kingdon trap of claim 1, wherein the entrance tube is located along the longitudinal direction at the maximum ion oscillation amplitude from the minimum of the potential well.

3. The Kingdon trap of claim 1, wherein the housing electrodes have a maximum inside diameter and wherein the entrance tube has a cylindrical or conical shape with one of a circular, a rectangular and a polygonal cross-section, with a smallest inside diameter of the entrance tube being between 1/20 and 1/100 of the maximum inside diameter of the housing electrodes, and the entrance tube has a wall thickness that is between around 1/5 and 1/20 of the smallest inside diameter.

4. The Kingdon trap of claim 1, wherein the housing electrodes have an inside diameter and a length and a ratio of the length to the inside diameter is selected so that ions introduced into the trap through the entrance tube oscillate in the longitudinal direction in a manner that the ions return to the location of the entrance tube after at least five longitudinal oscillations.

5. The Kingdon trap of claim 4 wherein the ions return to the location of the entrance tube after at least ten longitudinal oscillations.

6. The Kingdon trap of claim 1, further comprising a first voltage generator for establishing a DC operating voltage $\Delta U$ between the inner electrodes and the housing electrodes.

7. The Kingdon trap of claim 6, comprising a second voltage generator connected to the entrance tube so that the entrance tube can be held at a measuring phase potential, which differs from the voltage applied by the first voltage generator to the housing electrodes by a maximum of five percent of the operating voltage $\Delta U$, and held at an injection potential which differs from the voltage applied by the first voltage generator to the housing electrodes by five to twenty percent of the operating voltage $\Delta U$.

8. The Kingdon trap of claim 1, wherein the inner electrodes are centrally divided at right angles to the longitudinal direction and are used to measure image currents produced by the longitudinal ion oscillations.

9. A method for storing ions, comprising:

(a) providing a Kingdon ion trap having housing electrodes extending in a longitudinal direction, inner electrodes spaced from the housing electrodes in a direction transverse to the longitudinal direction, the housing electrodes and the inner electrodes being shaped so that ions introduced into the trap can oscillate harmonically in a potential well in the longitudinal direction and independently oscillate in the transverse direction when a DC operating voltage is applied between the housing electrodes and the inner electrodes and an entrance tube that extends through one of the housing electrodes and is insulated therefrom and allows ions to enter the ion trap;

(b) applying to the entrance tube an injection potential which differs from the DC operating voltage by five to twenty percent of the operating voltage;

(c) generating an ion cloud;

(d) transferring ions from the ion cloud through the entrance tube into the Kingdon trap; and (e) after heaviest ions of interest have entered the Kingdon trap, applying to the entrance tube a measuring phase potential which differs from the DC operating voltage by a maximum of five percent of the operating voltage.

10. The method of claim 9, wherein step (c) comprises generating the ion cloud by laser desorption.

11. The method of claim 9, wherein step (c) comprises generating the ion cloud by trapping ions produced from any type of ion source in one of a two-dimensional Paul trap and a three-dimensional Paul trap.

12. The method of claim 11, wherein step (c) further comprises isolating, fragmenting and reactively manipulating ions in the Paul trap in order to determine ion structure before transferring the ions into the Kingdon trap in step (d).

13. The method of claim 9, wherein step (b) comprises one of changing the injection potential continuously and changing the injection potential in steps during step (d).

14. A mass spectrometer comprising:

an ion source for producing ions;

a Paul ion trap for receiving the ions; and a Kingdon ion trap for receiving ions from the Paul ion trap, the Kingdon ion trap having, housing electrodes extending in a longitudinal direction;

inner electrodes spaced from the housing electrodes in a direction transverse to the longitudinal direction, the housing electrodes and the inner electrodes being shaped so that ions introduced into the Kingdon ion trap can oscillate harmonically in a potential well in the longitudinal direction and independently oscillate in the transverse direction when a DC electric field is established between the housing electrodes and the inner electrodes; and an entrance tube that extends through one of the housing electrodes and is insulated therefrom and allows ions to enter the Kingdon ion trap.

* * * * *